United States Patent
Lu (10) Patent No.: US 11,137,843 B2
(45) Date of Patent: Oct. 5, 2021

(54) MOUSE DEVICE

(71) Applicants: DEXIN ELECTRONIC LTD., Guangdong (CN); DEXIN CORPORATION, New Taipei (TW)

(72) Inventor: Ho-Lung Lu, New Taipei (TW)

(73) Assignees: DEXIN ELECTRONIC LTD., Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 16/908,748

(22) Filed: Jun. 23, 2020

(65) Prior Publication Data

US 2021/0278910 A1 Sep. 9, 2021

(30) Foreign Application Priority Data

Mar. 5, 2020 (TW) ................................. 109107290

(51) Int. Cl.
*G06F 3/038* (2013.01)
*G06F 3/039* (2013.01)
*G06F 3/0354* (2013.01)
*H02J 7/00* (2006.01)

(52) U.S. Cl.
CPC ............ *G06F 3/0383* (2013.01); *G06F 3/039* (2013.01); *G06F 3/03543* (2013.01); *G06F 3/03545* (2013.01); *H02J 7/0044* (2013.01); *G06F 2203/0381* (2013.01); *G06F 2203/0384* (2013.01)

(58) Field of Classification Search
CPC .............. G06F 3/0383; G06F 3/03543; G06F 3/03545; G06F 3/039; G06F 2203/0384; G06F 2203/0381; H02J 7/0044
See application file for complete search history.

(56) References Cited

U.S. PATENT DOCUMENTS

| | | | | |
|---|---|---|---|---|
| 8,570,306 | B2* | 10/2013 | Liang | G06F 3/03545 345/179 |
| 2007/0024601 | A1* | 2/2007 | Liu | G06F 3/03545 345/179 |
| 2008/0165163 | A1* | 7/2008 | Bathiche | G06F 3/03545 345/179 |
| 2009/0008163 | A1* | 1/2009 | Chikazawa | G06F 1/1616 178/19.01 |

(Continued)

FOREIGN PATENT DOCUMENTS

TW M446366 U * 2/2013 ............. G06F 3/033

*Primary Examiner* — Jonathan A Boyd
(74) *Attorney, Agent, or Firm* — Li & Cai Intellectual Property Office (57) ABSTRACT

A mouse device includes a mouse body, a stylus, and a power module. A long and narrow accommodating space is disposed at one side of the mouse body, and the long and narrow accommodating space has a first length. The stylus is detachably accommodated in the long and narrow accommodating space. When the stylus is accommodated in the long and narrow accommodating space, the stylus has a second length. When the stylus is detached from the mouse body, the stylus has a third length. The third length is longer than the second length and the first length. When the stylus is accommodated in the long and narrow accommodating space, a charging area of the stylus is electrically connected to the power module to charge the stylus.

7 Claims, 6 Drawing Sheets

(56) References Cited

U.S. PATENT DOCUMENTS

| | | | |
|---|---|---|---|
| 2014/0255079 A1* | 9/2014 | Fisher, Jr. | B43K 23/08 |
| | | | 401/115 |
| 2015/0084933 A1* | 3/2015 | Kinoshita | G06F 3/03545 |
| | | | 345/179 |
| 2018/0234505 A1* | 8/2018 | Humbert | G06F 9/544 |
| 2019/0116247 A1* | 4/2019 | Giles | B65H 75/4421 |

* cited by examiner

MOUSE DEVICE

CROSS-REFERENCE TO RELATED PATENT APPLICATION

This application claims the benefit of priority to Taiwan Patent Application No. 109107290, filed on Mar. 5, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse device, and more particularly to a mouse device that can accommodate a stylus.

BACKGROUND OF THE DISCLOSURE

Currently, most active styluses require users to perform communication pairing with electronic devices on their own before being available for use. Although manufacturers have already simplified the pairing procedure, with users owning more and more peripheral devices, repeated pairing of the peripheral devices with electronic devices can significantly decrease the user experience.

Moreover, even though many manufacturers have released various accessories (e.g., sheaths or cases for styluses and accessories that help prevent loss of the same), but for users, more accessories means more complication and more bits and pieces to keep track of, which is not only inconvenient, but also not easy to store.

In situations where both a mouse device and a stylus need to be used, storage thereof can become a bother for users.

Therefore, providing a mouse device that can both enable the storage of the stylus and simplify the operation of the communicative pairing process has become an important issue for the industry.

SUMMARY OF THE DISCLOSURE

In response to the above-referenced technical inadequacies, the present disclosure provides a mouse device.

In one aspect, the present disclosure provides a mouse device that includes a mouse body, a stylus, and a power module. A long and narrow accommodating space is disposed at one side of the mouse body, and the long and narrow accommodating space has a first length. The stylus is detachably accommodated in the long and narrow accommodating space. When the stylus is accommodated in the long and narrow accommodating space, the stylus has a second length that is shorter than the first length. When the stylus is detached from the mouse body, the stylus has a third length that is longer than the second length and the first length. When the stylus is accommodated in the long and narrow accommodating space, a charging area of the stylus is electrically connected to the power module to charge the stylus.

One of the advantages of the present disclosure is that, the mouse device provided by the present disclosure has an accommodating space to accommodate the stylus, so as to increase the portability of the mouse device and prevent the stylus from being misplaced. The mouse can charge the stylus and therefore make the usage of the power more efficient. In addition, only one of the mouse device and the stylus of the present disclosure is required to perform communication pairing with the electronic device, and the other device (the mouse device or the stylus) can be used without pairing, thus reducing the complexity of communication pairing and enhancing the user experience.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
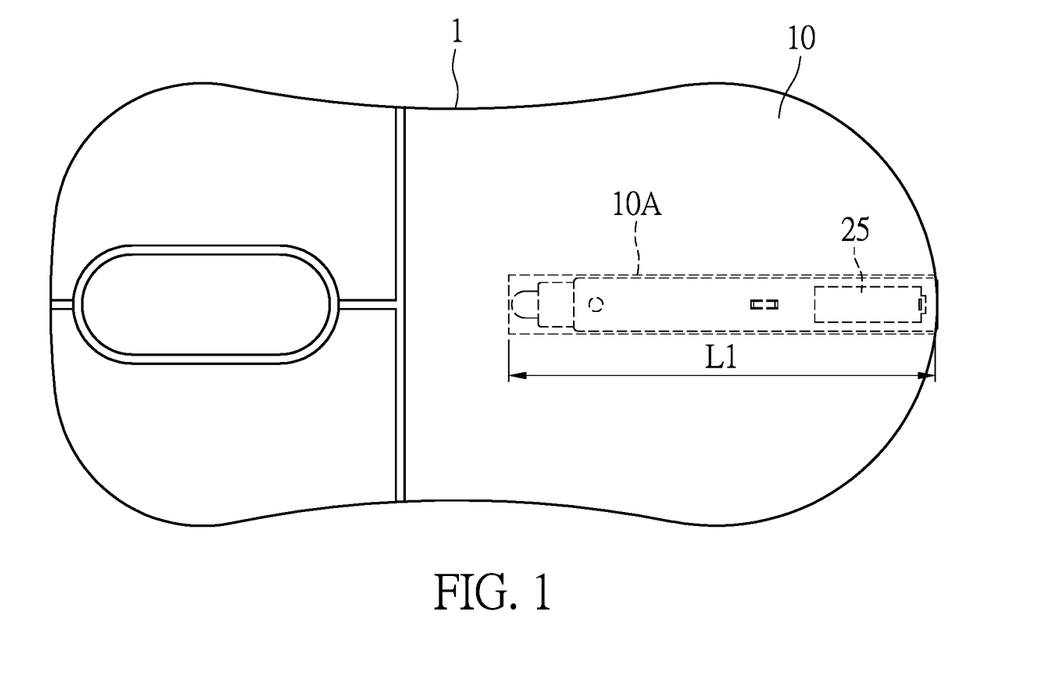
FIG. 1 is a top view of a mouse device in a first embodiment of the present disclosure.
Figure 2:
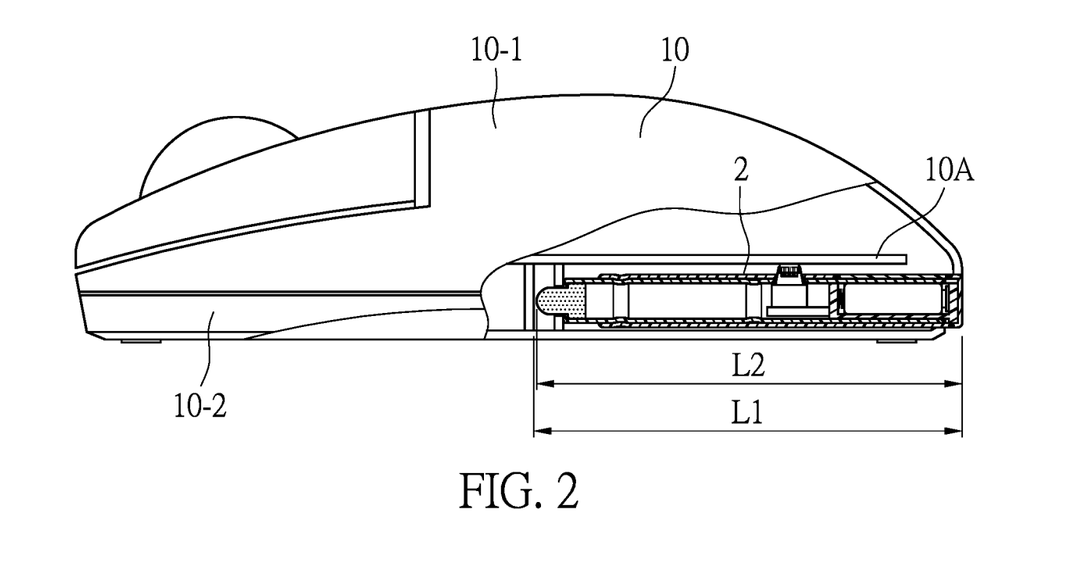
FIG. 2 is a partial sectional view of a mouse device in the first embodiment of the present disclosure.
Figure 3:
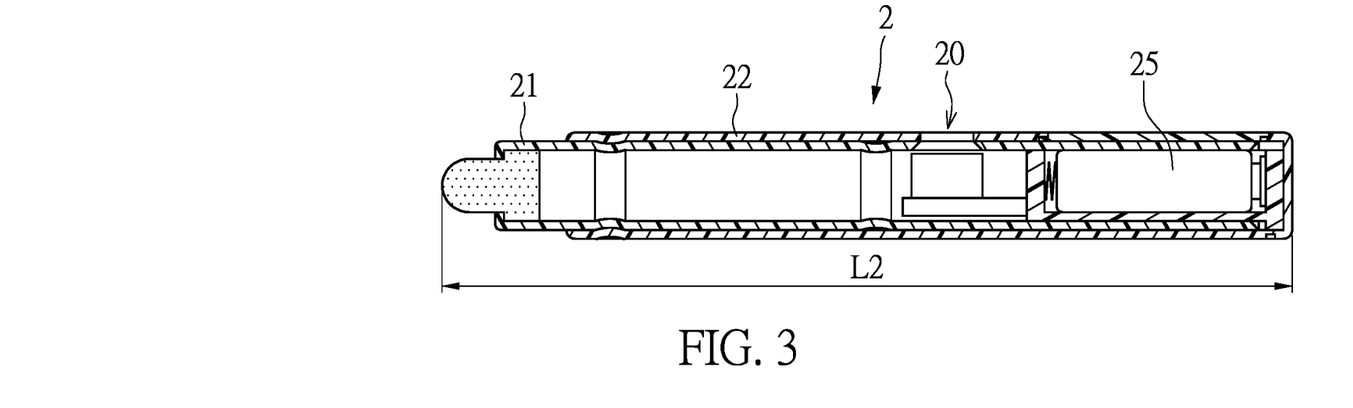
FIG. 3 is a sectional view of the stylus when a length thereof is shortened in one embodiment of the present disclosure.
Figure 4:
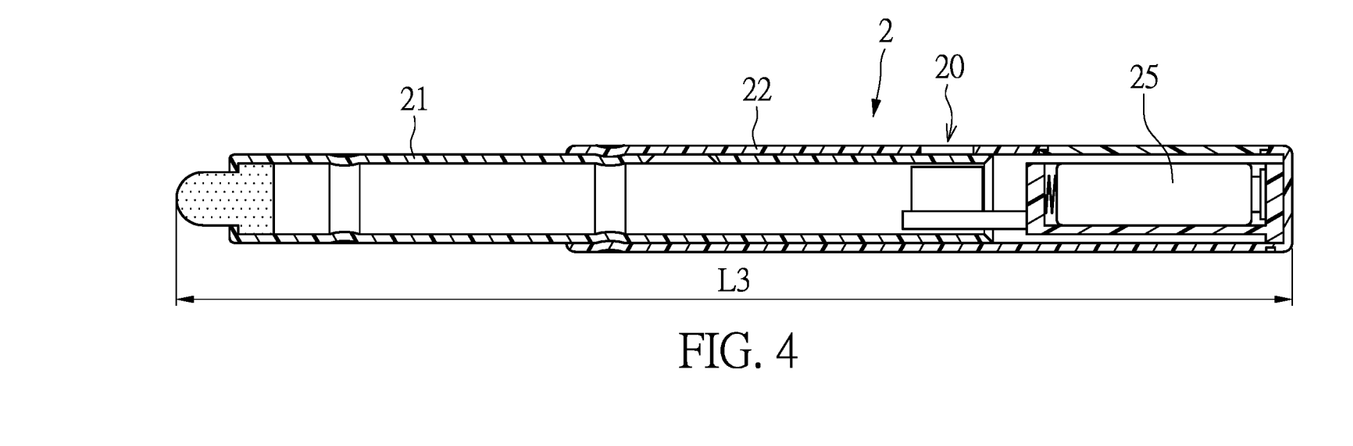
FIG. 4 is a sectional view of the stylus when a length thereof is lengthened in one embodiment of the present disclosure.
Figure 5:
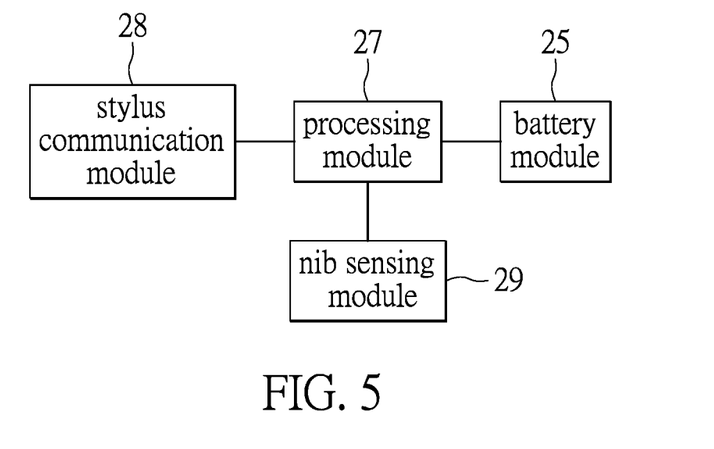
FIG. 5 is a functional block diagram of the mouse device in one embodiment of the present disclosure.
Figure 6:
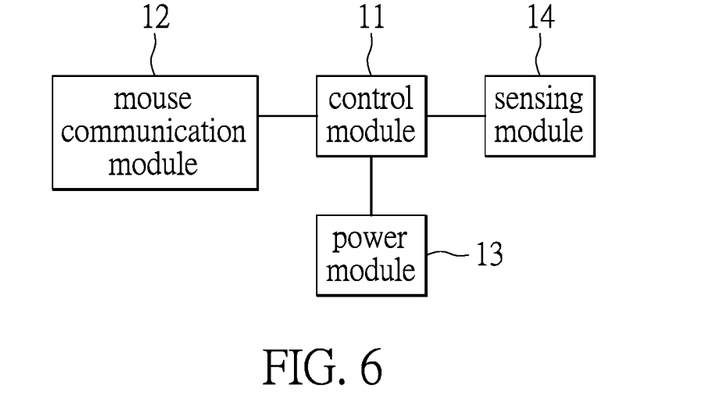
FIG. 6 is a functional block diagram of the stylus in one embodiment of the present disclosure.

Referring to FIG. 1, a top view of a mouse device in the first embodiment of the present disclosure is provided. Referring to FIG. 2, a partial sectional view of a mouse device in the first embodiment of the present disclosure is provided. Referring to FIG. 3, a sectional view of the stylus when a length thereof is shortened in one embodiment of the present disclosure is provided. Referring to FIG. 4, a sectional view of the stylus when a length thereof is lengthened in one embodiment of the present disclosure. is provided. Referring to FIG. 5, a functional block diagram of the mouse device in one embodiment of the present disclosure is provided. Referring to FIG. 6, a functional block diagram of the stylus in one embodiment of the present disclosure is provided.

The mouse device includes a mouse body 10. A long and narrow accommodating space 10A is disposed at one side of the mouse body. The long and narrow accommodating space 10A has a first length L1. A stylus 2 is detachably accommodated in the long and narrow accommodating space 10A. That is to say, the stylus 2 can be taken out of the long and narrow accommodating space 10A. In this embodiment, the mouse device 1 has the long and narrow accommodating space 10A to accommodate the stylus 2. The stylus 2 can be accommodated in the long and narrow accommodating space 10A conveniently, thus the mouse device 1 becomes portable and the method of communication pairing can be simplified. The mouse device 1 includes a control module 11, a mouse communication module 12, a power module 13, and a sensing module 14.

The mouse body 10 includes an upper shell 10-1 and a lower shell 10-2. The upper shell 10-1 and the lower shell 10-2 together form an accommodating space for accommodating the control module 11, the mouse communication module 12, the power module 13 and the sensing module 14. The long and narrow accommodating space 10A is disposed in the lower shell 10-2. In this embodiment, the long and narrow accommodating space 10A can be produced through technology related to mechanism injection molding design.

The stylus 2 includes a battery module 25, a processing module 27, a stylus communication module 28 and a nib sensing module 29. The processing module 27 is electrically connected to the battery module 25, the stylus communication module 28 and the nib sensing module 29. The stylus communication module 28 of the stylus 2 is communicatively connected to the mouse communication module 12 of the mouse device 1.

When the stylus 2 is accommodated in the long and narrow accommodating space 10A, the stylus 2 has a second length L2. The second length L2 is shorter than the first length L1. In addition, when the stylus 2 is detached from the mouse body 1, the stylus 2 has a third length L3, and the third length L3 is longer than the second length L2 and the first length L1.

The control module 11 is electrically connected to the mouse communication module 12, the power module 13, and the sensing module 14. The power module 13 provides a driving power to the control module 11, the mouse communication module 12 and the sensing module 14. In this embodiment, the power module 13 is a battery. Furthermore, the power module 13 can further include a direct current (DC) to DC voltage conversion unit (not shown in the figures) to receive a DC voltage and convert the DC voltage into a charging voltage of the power module 13. In other embodiments, the power module 13 can further include a wireless charging unit to receive a wireless power provided by a wireless charging module from outside. The sensing module 14 detects the displacement of the mouse device 1 and provides a displacement signal to the control module 11.

When the stylus 2 is accommodated in the long and narrow accommodating space 10A, a charging area 20 of the stylus 2 is electrically connected to the power module 13 to charge the stylus. In this embodiment, the stylus 2 includes a battery module 25. The power module 13 charges the battery module 25 of the stylus 2.

When the stylus 2 is accommodated in the long and narrow accommodating space 10A, the second length L2 of the stylus 2 is shorter than the first length L1, so that the structure of the stylus 2 in this embodiment is a retractable structure.

The stylus 2 includes at least a first shell 21 and a second shell 22. The first shell 21 is accommodated in the second shell 22. That is to say, the inner diameter of the second shell 22 is slightly larger than the outer diameter of the first shell 21. Furthermore, both the first shell 21 and the second shell 22 are hollow shells. The control module (not shown in the figure) of the stylus 2 and the battery module 25 are disposed in the first shell 21 or the second shell 22. In this embodiment, the stylus 2 is an active stylus that has a considerable amount of power consumption. Therefore, when the first shell 21 is accommodated in the second shell 22 and the stylus 2 is accommodated in the long and narrow accommodating space 10A, a charging area 20 of the stylus 2 is then revealed and is electrically connected to the power module 13. That is to say, when the stylus 2 is detached from the mouse device 1 and the length of the stylus 2 is the same as the third length L3, the charging area 25A of the stylus 2 is not revealed.

Figure 7:
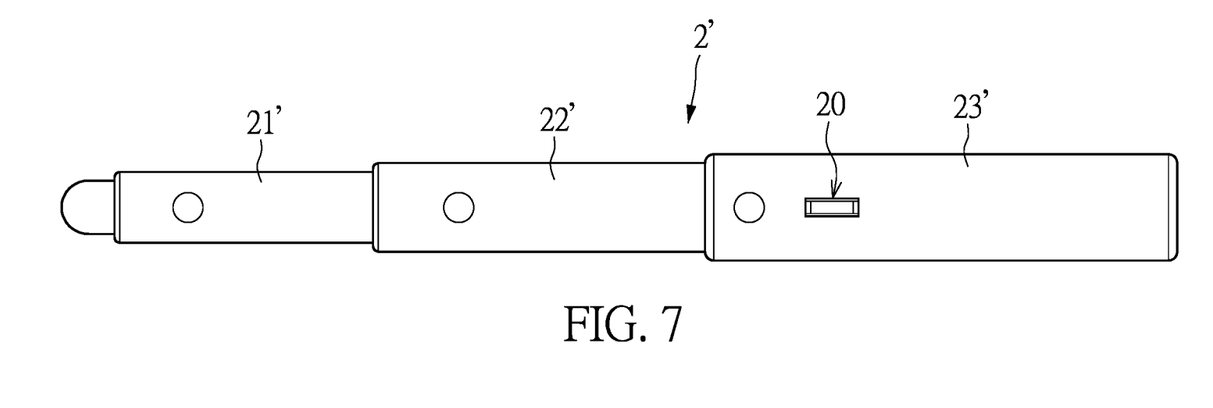
FIG. 7 is a schematic view of the stylus in one embodiment of the present disclosure.

Referring to FIG. 7, a schematic view of the stylus in one embodiment of the present disclosure is provided.

A stylus 2' includes a first shell 21', a second shell 22' and a third shell 23'. The first shell 21' is movably accommodated in the second shell 22', and the second shell 22' is movably accommodated in the third shell 23'.

Figure 8:
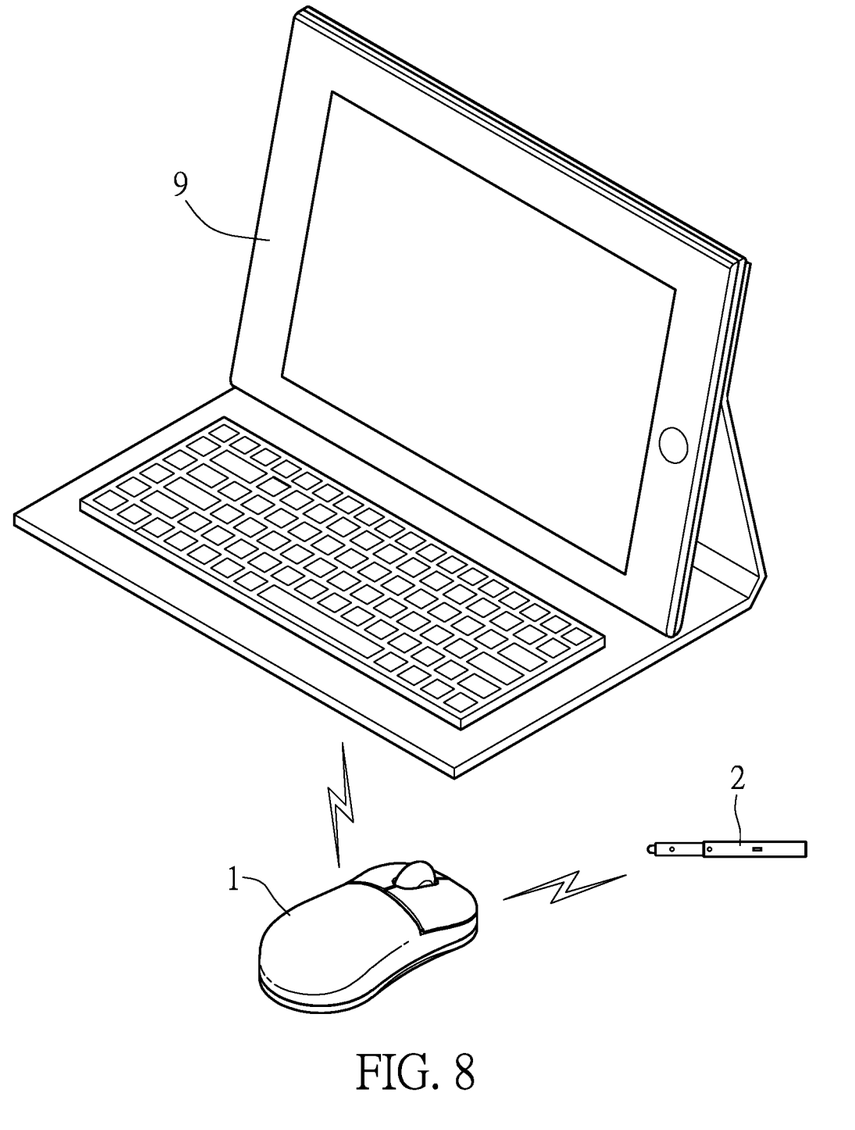
FIG. 8 is a schematic view showing signals being transmitted between an electronic device and the mouse device of the present disclosure communicatively connected thereto.

Referring to FIG. 8, a schematic view showing signals being transmitted between an electronic device and the mouse device of the present disclosure communicatively connected thereto is provided.

When the communication module 12 of the mouse device 1 is paired with the electronic device 9, the stylus communication module 28 of the stylus 2 is communicatively connected to the electronic device 9 through the mouse communication module 12 of the mouse device 1. That is to say, users can perform communication pairing of the mouse device 1 and the electronic device 9. After the pairing is successful, users can use the stylus 2 to operate the electronic device 9. The control signal of the nib sensing module 29 of the stylus 2 is then transmitted to the mouse communication module 12 of the mouse device 1 through the stylus communication module 28 and then to the electronic device 9. That is to say, the stylus 2 is communicatively connected to the electronic device 9 through the mouse communication module 12 of the mouse device 1. In this embodiment, the electronic device 9 is a touchscreen mobile phone, a tablet computer, a notebook computer or a wearable electronic device, and the present disclosure is not limited thereto.

In this embodiment, the mouse communication module 12 and the stylus communication module 28 are each one of a Bluetooth communication module, a Wi-Fi communication module, or a ZigBee communication module.

Figure 9:
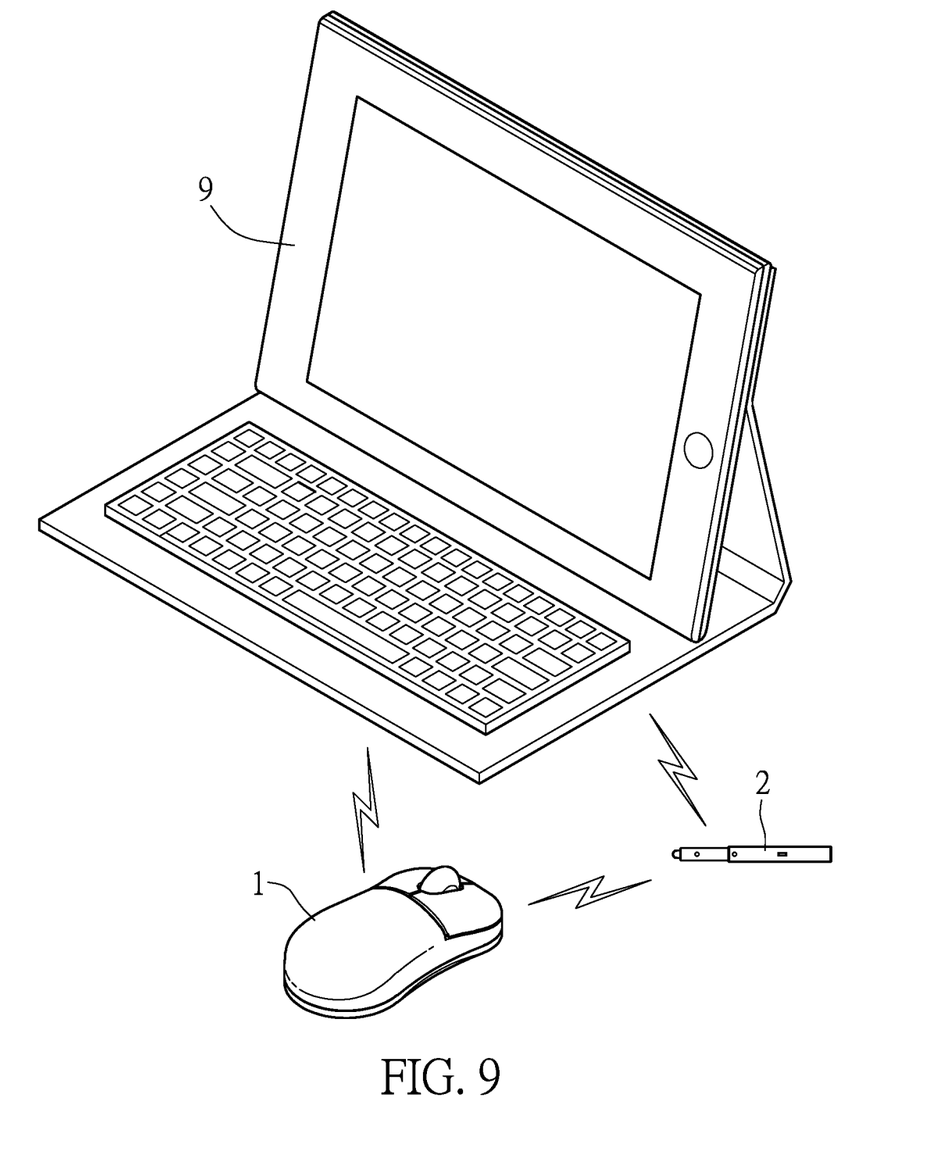
FIG. 9 is a schematic view showing signals being transmitted between an electronic device and the mouse device of the present disclosure communicatively connected thereto.

Referring to FIG. 9, a schematic view showing signals being transmitted between an electronic device and the mouse device of the present disclosure communicatively connected thereto is provided.

When the mouse communication module 12 of the mouse device 1 is paired with the electronic device 9, the stylus communication module 28 of the stylus 2 is simultaneously paired with the electronic device 9, and the mouse communication module 12 of the mouse device 1 and the stylus communication module 28 of the stylus 2 can then be communicatively connected to the electronic device 9, correspondingly. That is to say, pairing verification codes of the mouse communication module 12 of the mouse device 1 and the stylus communication module 28 of the stylus 2 are essentially the same. Therefore, users can use the mouse communication module 12 of the mouse device 1 to perform communication pairing with the electronic device 9, or use the stylus communication module 28 of the stylus 2 to pair with the electronic device 9, and then the electronic device 9 simultaneously records communicative connection statuses and the pairing verification codes of the mouse device 1 and the stylus 2. The mouse device 1 and the stylus 2 can then be paired in communication with the electronic device 9 through the mouse communication module 12 and the stylus communication module 28, respectively.

That is to say, in this embodiment, the mouse communication module 12 of the mouse device 1 and the stylus communication module 28 of the stylus 2 can respectively send communication signals to the electronic device 9, but the mouse device 1 and the stylus 2 have the same pairing verification codes.

In other words, no matter whether users use the mouse device 1 or the stylus 2 to perform communication pairing with the electronic device 9, both the mouse device 1 and the stylus 2 can operate the electronic device 9. In this embodiment, the mouse communication module 12 and the stylus communication module 28 are each one of a Bluetooth communication module, a Wi-Fi communication module, or a ZigBee communication module. The electronic device 9 is a touchscreen mobile phone, a tablet computer, a notebook computer or a wearable electronic device, but the present disclosure is not limited thereto.

One of the advantages of the present disclosure is that, the mouse device provided by the present disclosure has an accommodating space to accommodate the stylus, so as to increase the portability of the mouse device and prevent the stylus from being misplaced. The mouse can charge the stylus and therefore make the usage of the power more efficient. In addition, only one of the mouse device and the stylus of the present disclosure is required to perform communication pairing with the electronic device, and the other device (the mouse device or the stylus) can be used without pairing, thus reducing the complexity of communication pairing and enhancing the user experience.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse device, comprising:
 a mouse body, a long and narrow accommodating space being disposed at one side of the mouse body, the long and narrow accommodating space having a first length;
 a stylus being detachably accommodated in the long and narrow accommodating space, wherein when the stylus is accommodated in the long and narrow accommodating space, the stylus has a second length that is shorter than the first length, and when the stylus is detached from the mouse body, the stylus has a third length that is longer than the first length; and
 a power module, wherein when the stylus is accommodated in the long and narrow accommodating space, a charging area of the stylus is electrically connected to the power module to charge the stylus;
 wherein the stylus at least includes a first shell and a second shell, and the first shell is capable of being accommodated in the second shell, when the first shell is accommodated in the second shell, the charging area of the stylus is exposed to be connected to the power module, and when the first shell is not accommodated in the second shell, the charging area is not exposed.

2. The mouse device according to claim 1, wherein the stylus further includes a third shell, the first shell is accommodated in the second shell, and the second shell is accommodated in the third shell.

3. The mouse device according to claim 1, further including:
 a control module electrically connected to the power module; and
 a mouse communication module electrically connected to the control module and the power module;
 wherein the stylus is communicatively connected to the mouse communication module of the mouse device.

4. The mouse device according to claim 3, wherein the stylus includes a stylus communication module communicatively connected to the mouse communication module.

5. The mouse device according to claim 4, wherein when the mouse communication module of the mouse device is paired with an electronic device, the stylus communication module of the stylus is communicatively connected to the electronic device through the mouse communication module of the mouse device.

6. The mouse device according to claim 4, wherein when the mouse communication module of the mouse device is paired with an electronic device, the stylus communication module of the stylus simultaneously pairs with the electronic device, and the mouse communication module of the mouse device and the stylus communication module of the stylus are communicatively connected to the electronic device.

7. The mouse device according to claim 4, wherein the mouse communication module and the stylus communication module are each one of a Bluetooth® communication module, a Wi-Fi communication module, and a ZigBee® communication module.

\* \* \* \* \*